United States Patent
Shimazu et al.

(10) Patent No.: US 9,192,986 B2
(45) Date of Patent: Nov. 24, 2015

(54) CAGE, ROLLING BEARING, METHOD FOR MANUFACTURING CAGE, AND INJECTION MOLD

(75) Inventors: Eiichirou Shimazu, Kuwana (JP); Yasutake Hayakawa, Kuwana (JP)

(73) Assignee: NTN CORPORATION, Osaka (JP)

( * ) Notice: Subject to any disclaimer, the term of this patent is extended or adjusted under 35 U.S.C. 154(b) by 778 days.

(21) Appl. No.: 13/202,529

(22) PCT Filed: Feb. 17, 2010

(86) PCT No.: PCT/JP2010/052350
§ 371 (c)(1),
(2), (4) Date: Aug. 19, 2011

(87) PCT Pub. No.: WO2010/095647
PCT Pub. Date: Aug. 26, 2010

(65) Prior Publication Data
US 2012/0039558 A1  Feb. 16, 2012

(30) Foreign Application Priority Data
Feb. 20, 2009 (JP) .................. 2009-037787

(51) Int. Cl.
*F16C 33/41* (2006.01)
*F16C 33/44* (2006.01)
(Continued)

(52) U.S. Cl.
CPC . *B22C 9/28* (2013.01); *B22D 17/22* (2013.01); *B22D 21/04* (2013.01); *F16C 33/385* (2013.01);
(Continued)

(58) Field of Classification Search
CPC ........ B22D 17/00; B22D 17/10; B22D 21/04; B22D 29/00; F16C 33/3837; F16C 33/3843; F16C 33/385; F16C 33/3856; F16C 33/41; F16C 33/412; F16C 33/414; F16C 33/416; F16C 33/44; F16C 33/4617; F16C 33/4623; F16C 33/4629; F16C 33/4635; F16C 33/49; F16C 33/494; F16C 33/495; F16C 33/497; F16C 33/498; F16C 33/56
USPC .......... 384/527, 531; 164/113, 303, 312, 900, 164/131
See application file for complete search history.

(56) References Cited

U.S. PATENT DOCUMENTS 5,558,448 A * 9/1996 Yabe et al. ............... 384/470
7,296,611 B2 * 11/2007 Hirai et al. ............... 164/113
2004/0240205 A1 12/2004 Hayakawa et al.

FOREIGN PATENT DOCUMENTS

CN    1549987 A    11/2004
JP    57-139462 A    8/1982
(Continued)

OTHER PUBLICATIONS

Machine translation of JP 2000-213544A, generated by JPO online machine translation service on Feb. 19, 2014.*
(Continued)

*Primary Examiner* — Phillip A Johnson
(74) *Attorney, Agent, or Firm* — McDermott Will & Emery LLP

(57) ABSTRACT

A cage (14) is made of a magnesium alloy and has a light weight and a high strength. The cage (14) is made of a magnesium alloy such as AZ91D, and is formed by means of injection molding. In this cage (14), a confluence region is brought away to outside the cage (14) during the injection molding. The confluence region is a region including voids formed by merging of flows of the magnesium alloy.

8 Claims, 5 Drawing Sheets

(51) Int. Cl.
- *B22C 9/28* (2006.01)
- *B22D 17/22* (2006.01)
- *B22D 21/04* (2006.01)
- *F16C 33/38* (2006.01)
- *F16C 33/49* (2006.01)
- *F16C 33/56* (2006.01)

(52) U.S. Cl.
CPC .............. *F16C 33/44* (2013.01); *F16C 33/495* (2013.01); *F16C 33/56* (2013.01); *F16C 2204/26* (2013.01); *F16C 2220/04* (2013.01)

(56) References Cited

FOREIGN PATENT DOCUMENTS

| | | |
|---|---|---|
| JP | 57-139462 U | 8/1982 |
| JP | 60-078416 | 5/1985 |
| JP | 6-154986 A | 6/1994 |
| JP | 09-272945 | 10/1997 |
| JP | 10-318263 | 12/1998 |
| JP | 2000-213544 | 8/2000 |
| JP | 2002-122148 | 4/2002 |
| JP | 2004-074270 | 3/2004 |
| JP | 2005-127493 | 5/2005 |
| JP | 2005-140269 | 6/2005 |
| JP | 2005-163997 | 6/2005 |
| JP | 2007-078118 | 3/2007 |

OTHER PUBLICATIONS

Machine translation of JP 2004-074270A, generated by JPO online machine translation service on Feb. 19, 2014.*

European Search Report issued in European Patent Application No. 10743773.3 mailed on Nov. 29, 2012.

Office Action issued in Chinese Patent Application No. 201080008974.4 dated Mar. 26, 2013, with partial English translation.

* cited by examiner

CAGE, ROLLING BEARING, METHOD FOR MANUFACTURING CAGE, AND INJECTION MOLD

RELATED APPLICATIONS

This application is the U.S. National Phase under 35 U.S.C. §371 of International Application No. PCT/JP2010/052350, filed on Feb. 17, 2010, which in turn claims the benefit of Japanese Application No. 2009-037787, filed on Feb. 20, 2009, the disclosures of which Applications are incorporated by reference herein.

TECHNICAL FIELD

The present invention relates to a cage, a rolling bearing, a method for manufacturing the cage, and an injection mold, more particularly, a cage made of a magnesium alloy, a rolling bearing including the cage, a method for manufacturing the cage made of the magnesium alloy, and an injection mold usable for the manufacturing method.

BACKGROUND ART

As a cage for holding a rolling element of a rolling bearing, a metal cage made of steel or brass may be used. The metal cage is excellent in strength but results in high cost when being processed into a complicated shape disadvantageously. Further, the raw material thereof has a large specific gravity to result in a large mass. Accordingly, such a metal cage is unfavorable for bearings for high-speed rotation applications or transportation equipment applications, which require reduced weight, disadvantageously.

In contrast, cages made of resin have been known. Such cages can be molded readily and achieve reduced weight. Further, there have been proposed cages each made of a resin fiber-reinforced by incorporating a fiber into the resin (for example, see Japanese Patent Laying-Open No. 2005-127493, Japanese Patent Laying-Open No. 2005-140269, Japanese Patent Laying-Open No. 2005-163997, and Japanese Patent Laying-Open No. 2007-78118 (Patent Literatures 1-4)). These make it possible to provide a cage that can be processed into a desired shape at low cost and achieves reduced weight while securing a certain level of strength.

For applications requiring a higher strength while achieving reduced weight, it has been also proposed that a cage manufactured by semi-molten molding of a magnesium alloy is applicable. Accordingly, there can be provided a cage suitable for high-speed rotation because of its excellent moldability, high strength, and light weight (for example, see Japanese Patent Laying-Open No. 2000-213544 (Patent Literature 5)).

CITATION LIST

Patent Literature

PTL 1: Japanese Patent Laying-Open No. 2005-127493
PTL 2: Japanese Patent Laying-Open No. 2005-140269
PTL 3: Japanese Patent Laying-Open No. 2005-163997
PTL 4: Japanese Patent Laying-Open No. 2007-78118
PTL 5: Japanese Patent Laying-Open No. 2000-213544

SUMMARY OF INVENTION

Technical Problem

Each of the above-described cages made of resin is generally molded by means of injection molding. In order to secure desired strength, such a cage made of resin is likely to be provided with a reinforcement material having a large aspect ratio such as a fiber. This raises problems in anisotropy in mold shrinkage amount and machine characteristics, which results from flow orientation. Further, in a weld portion formed during the injection molding, the longitudinal side of the reinforcement material tends to be arranged along the weld line. Accordingly, the effect of reinforcement by the reinforcement material does not extend to the weld portion. This makes it difficult to secure strength in the weld portion, disadvantageously.

On the other hand, in each of the cages made of magnesium alloy, the reinforcement material having a large aspect ratio is not usually used. Hence, the problem in anisotropy, caused by providing the reinforcement material, does not take place. However, when actually molding a cage made of a magnesium alloy by means of injection molding, high strength and fatigue characteristics, which should have been attained in the first place, cannot be attained sufficiently.

In view of these, an object of the present invention is to provide a cage made of a magnesium alloy and having a light weight and a high strength, a rolling bearing including the cage, and a method for manufacturing the cage. Another object of the present invention is to provide an injection mold suitably applied to the method for manufacturing the cage made of magnesium alloy and having a light weight and a high strength.

Solution to Problem

A cage according to the present invention is a cage for holding a rolling element in a rolling bearing. The cage is made of a magnesium alloy, and is molded by injection molding. A confluence region is brought away to outside the cage during the injection molding, the confluence region being a region including a void formed by merging of flows of the magnesium alloy including a liquid phase.

The present inventors have analyzed a cause of the insufficient strength and fatigue characteristics of the cage made of magnesium alloy, which should have been obtained in the first place, and have considered a countermeasure therefor. As a result, the present inventors have obtained the following knowledge and arrived at the present invention.

Specifically, when fabricating a cage made of a magnesium alloy by means of injection molding, flows of magnesium alloy including a liquid phase is moved to fill the inside (cavity portion) of the mold. On this occasion, a region at which the flows of magnesium alloy including a liquid phase are merged is formed depending on the shape of the cage and the number of gates. Here, the magnesium alloy for the injection molding is supplied into the mold with its viscosity significantly smaller than that of a general resin. Further, the magnesium alloy has a smaller specific heat than such a general resin, is therefore excellent in thermal conductivity, and is accordingly solidified fast. To address such characteristics of the magnesium alloy, the magnesium alloy is supplied into the mold at a rate faster by several times or approximately ten times than injection molding of the general resin. This is likely to cause turbulent flows of the magnesium alloy. Accordingly, gas (such as air) in the mold is likely to be involved therein. As a result, the gas is contained in the region at which the flows of magnesium alloy are merged, thereby forming the confluence region including the void. The void in the confluence region results in insufficient strength of such a cage made of magnesium alloy although the strength and fatigue characteristics thereof should have been sufficient in the first place.

To address this, in the cage of the present invention, the confluence region including the void formed by the merging of the flows of magnesium alloy including a liquid phase is brought away to outside the cage. As a result, according to the cage of the present invention, there can be provided a cage made of a magnesium alloy and having a light weight and a high strength. Further, the cage is preferably manufactured by injecting, into the mold, a magnesium alloy controlled to only have a liquid phase (controlled not to include a solid phase) by heating to fall within a temperature range equal to or higher than the melting point thereof. Accordingly, a cage made of a magnesium alloy can be provided which suppresses formation of segregation phases and is excellent in fatigue strength.

Preferably, in the cage, the magnesium alloy contains aluminum, zinc, and manganese. The magnesium alloy containing aluminum, zinc, and manganese is suitable for injection molding. Using such a magnesium alloy, the cage of the present invention can be manufactured readily. Here, an example of such a magnesium alloy containing aluminum, zinc, and manganese is the ASTM standard AZ91D.

The cage may be comb-shaped. Such a comb-shaped cage has a comb-like shape having an annular portion having an annular shape, and a plurality of pillar portions axially projecting from the annular portion. Hence, the pillar portions are likely to be deflected and therefore the cage is required to have a high specific rigidity. Hence, the cage of the present invention, which is made of a magnesium alloy and therefore has a high specific rigidity, is suitably employed for the comb-shaped cage.

A rolling bearing according to the present invention includes: a raceway member; a plurality of rolling elements arranged in contact with the raceway member; and a cage for rollably holding the rolling element. The cage is the above-described cage of the present invention.

The rolling bearing of the present invention employs the cage made of a magnesium alloy and having a light weight and a high strength in the present invention. As a result, according to the rolling bearing of the present invention, there can be provided a highly reliable rolling bearing suitable for high-speed rotation.

The rolling bearing of the present invention may be a bearing used to rotatably support a main shaft of a machine tool relative to a member disposed opposite to the main shaft.

The main shaft of the machine tool is rotated at a very fast rotating speed. Hence, a cage of a bearing for supporting it (machine tool rolling bearing) is required to have a high strength and a light weight. Further, when rigidity is insufficient for centrifugal force resulting from the high rotating speed of the machine tool rolling bearing, the cage is deformed to result in decreased rotation precision of the bearing (NRRO (Non-Repeatable Run-Out); increased asynchronous vibration) and greater heat generation in the bearing, disadvantageously. In contrast, the rolling bearing of the present invention includes the cage made of a magnesium alloy and having not only a light weight and a high strength but also a large specific rigidity, and is therefore suitable for a machine tool rolling bearing.

A method for manufacturing a cage in the present invention is a method for manufacturing a cage for holding a rolling element in a rolling bearing. The method includes the steps of: causing a liquid phase of a magnesium alloy by heating the magnesium alloy; molding the magnesium alloy, which includes the liquid phase caused, into a shape of the cage by injecting the magnesium alloy into a mold including a cavity portion corresponding to the shape of the cage so as to fill the cavity portion with the magnesium alloy; and extracting, from the mold, the cage formed of the magnesium alloy thus molded into the shape of the cage. In the step of molding the magnesium alloy into the shape of the cage, a confluence region is brought away to outside the cavity portion, the confluence region being a region including a void formed by merging of flows of the magnesium alloy including the liquid phase.

In the method for manufacturing the cage in the present invention, the confluence region including the void formed by merging of the flows of the magnesium alloy including the liquid phase is brought away to outside the cavity portion. Accordingly, the confluence region including the void is prevented from remaining in the cage to result in decreased strength. As a result, according to the method for manufacturing the cage in the present invention, there can be manufactured a cage made of magnesium alloy and having a light weight and a high strength.

In the method for manufacturing the cage, the magnesium alloy preferably contains aluminum, zinc, and manganese. The magnesium alloy containing aluminum, zinc, and manganese is suitable for injection molding. Use of such a magnesium alloy facilitates manufacturing of a cage made of magnesium alloy and having a light weight and a high strength.

In the method for manufacturing the cage, the cage may be comb-shaped. In such a comb-shaped cage, pillar portions are likely to be deflected and therefore the cage is required to have a high specific rigidity. Hence, the method for manufacturing the cage of the present invention, which is made of the magnesium alloy and therefore has a high specific rigidity, is suitably employed for manufacturing of such a comb-shaped cage.

An injection mold according to the present invention is an injection mold used for injection molding of a cage made of a magnesium alloy for holding a rolling element in a rolling bearing. The injection mold includes: a cavity portion having a shape corresponding to that of the cage; and a runner portion connected to the cavity portion and including a gate portion supplying the magnesium alloy to the cavity portion. The cavity portion includes a weld region, which is a region at which flows of the magnesium alloy supplied from the gate portion of the runner portion to the cavity portion are merged. The injection mold further includes an overflow portion connected to the weld region of the cavity portion and storing the magnesium alloy having reached the weld region and flooded from the cavity portion. It should be noted that the type of gate is not particularly limited. Various types of gate can be employed such as a side gate, a spoke gate, a pin gate, a submarine gate, a film gate, and a disk gate.

In the injection mold of the present invention, the overflow portion is provided which is connected to the weld region of the cavity portion. The overflow portion includes, for example, a discharging portion connected to the weld region of the cavity portion; and a retaining portion connected to the discharging portion to store the magnesium alloy therein. Accordingly, after the confluence region including the void formed by the merging of the flows of the magnesium alloy including the liquid phase is formed at the weld region of the cavity portion, the confluence region can be brought away to the overflow portion. As a result, using the injection mold of the present invention, there can be manufactured a cage made of a magnesium alloy and having a light weight, a high strength, and excellent fatigue characteristics.

Preferably in the injection mold, the runner portion has a gate portion boundary surface, which is a surface of a boundary with the cavity portion, and the gate portion boundary surface has an area smaller than a cross sectional area of a plane adjacent to the gate portion boundary surface and parallel to the gate portion boundary surface. In addition, the overflow portion has a discharging portion boundary surface, which is a surface of a boundary with the cavity portion, and the discharging portion boundary surface has a cross sectional area smaller than a cross sectional area of a plane adjacent to the discharging portion boundary surface and parallel to the discharging portion boundary surface.

By employing such a configuration, the magnesium alloy (cage) solidified in the cavity portion can be readily separated at the gate portion boundary surface from the magnesium alloy solidified in the runner portion. Also, the magnesium alloy (cage) solidified in the cavity portion can be readily separated at the discharging portion boundary surface from the magnesium alloy solidified in the overflow portion.

Further, by adjusting the areas of the gate portion boundary surface and the discharging portion boundary surface in view of strength of the magnesium alloy at the boundary surfaces, the magnesium alloy (cage) solidified in the cavity portion and the magnesium alloy solidified in the other regions can be separated simultaneously when extracting the molded cage from the mold. This leads to simplified manufacturing process. Although it depends on the size of the cage, each of the gate portion boundary surface and the discharging portion boundary surface is adjusted to have an area not more than 15 mm$^2$ in order to facilitate separating the cage from the magnesium alloy solidified in the other regions simultaneously upon extracting the molded cage from the mold, assuming that the ASTM standard AZ91D is employed as the magnesium alloy and the submarine gate is employed as the type of gate. It should be noted that each of the gate portion boundary surface and the discharging portion boundary surface preferably has a height (width in the axial direction) of 4 mm or smaller, more preferably, 3 mm or smaller irrespective of the type of gate, in order to reduce roughness caused by so-called "torn-off" formed in the regions of the cage corresponding to the vicinities of the gate portion boundary surface and the discharging portion boundary surface.

Advantageous Effects of Invention

As apparent from the description above, according to the cage, the rolling bearing, and the method for manufacturing the cage in the present invention, there can be provided a cage made of a magnesium alloy and having a light weight and a high strength, a rolling bearing having the cage, and a method for manufacturing the cage. Further, according to the injection mold of the present invention, there can be provided an injection mold suitably applied to the method for manufacturing the cage made of a magnesium alloy and having a light weight and a high strength.

DESCRIPTION OF EMBODIMENTS

Figure 1:
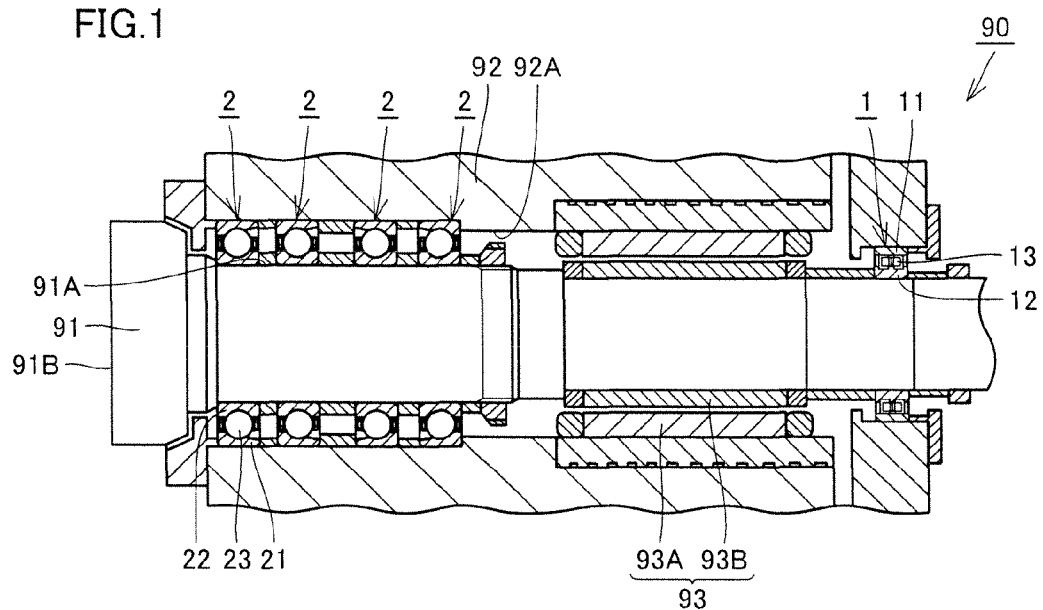
FIG. 1 is a schematic cross sectional view showing a configuration around a main shaft of a machine tool including machine tool rolling bearings.

The following describes embodiments of the present invention with reference to figures. It should be noted that in the below-mentioned figures, the same or corresponding portions are given the same reference characters and are not described repeatedly.

First Embodiment

First, one embodiment of the present invention, i.e., a first embodiment will be described. Referring to FIG. 1, a machine tool 90 in the present embodiment includes: a main shaft 91 having a cylindrical shape; a housing 92 surrounding the outer circumferential surface of main shaft 91; and a double-row cylindrical roller bearing 1 (rear bearing) and angular contact ball bearings 2 (front bearing) serving as machine tool rolling bearings. Double-row cylindrical roller bearing 1 and each of angular contact ball bearings 2 are disposed to be fit between main shaft 91 and housing 92 such that the respective outer circumferential surfaces of their outer ring 11 and outer ring 21 are in contact with an inner wall 92A of the housing and the respective inner circumferential surfaces of their inner ring 12 and inner ring 22 are in contact with outer circumferential surface 91A of main shaft 91. Accordingly, main shaft 91 is supported to be axially rotatable relative to housing 92.

Further, at main shaft 91, a motor rotor 93B is installed to partially surround outer circumferential surface 91A. On inner wall 92A of housing 92, a motor stator 93A is installed at a location opposite to motor rotor 93B. Motor stator 93A and motor rotor 93B constitute a motor 93 (built-in motor). Accordingly, main shaft 91 is rotatable relative to housing 92 by motive power provided by motor 93.

In other words, each of double-row cylindrical roller bearing 1 and angular contact ball bearing 2 is a machine tool rolling bearing for rotatably supporting main shaft 91 of machine tool 90 relative to housing 92, which is a member disposed opposite to main shaft 91.

The following describes an operation of machine tool 90. Referring to FIG. 1, when motor stator 93A of motor 93 is fed with electric power from a power source not shown in the figure, driving power for axially rotating motor rotor 93B is generated. Accordingly, main shaft 91, which is rotatably supported relative to housing 92 by angular contact ball bearings 2 and double-row cylindrical roller bearing 1, is rotated together with motor rotor 93B relative to housing 92. With main shaft 91 thus rotating, a tool (not shown in the figure) attached to tip 91B of main shaft 91 cuts or grinds a workpiece. In this way, the workpiece can be processed.

Figure 2:
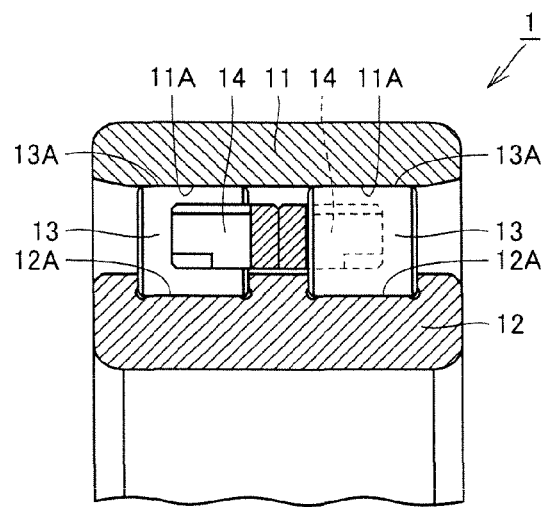
FIG. 2 is a schematic partial cross sectional view illustrating a configuration of a double-row cylindrical roller bearing.

The following describes double-row cylindrical roller bearing 1. Referring to FIG. 2, double-row cylindrical roller bearing 1 includes: outer ring 11 serving as a first raceway member; inner ring 12 serving as a second raceway member; and cylindrical rollers 13 serving as a plurality of rolling elements; and cages 14. Outer ring 11 has an inner circumferential surface provided with outer ring raceway surfaces 11A each serving as a first raceway surface of an annular shape and formed in double rows (two rows). Inner ring 12 has an outer circumferential surface provided with inner ring raceway surfaces 12A each serving as a second raceway surface of an annular shape and formed in double rows (two rows) opposite to outer ring raceway surfaces 11A formed in double rows (two rows). Further, each of the plurality of cylindrical rollers 13 is provided with a roller contact surface 13A (outer circumferential surface of cylindrical roller 13) serving as a rolling element contact surface. Further, cylindrical rollers 13 are in contact with outer ring raceway surfaces 11A and inner ring raceway surfaces 12A at roller contact surfaces 13A and are arranged circumferentially at a predetermined pitch using cages 14 each having an annular shape. Accordingly, cylindrical rollers 13 can be held to be rollable on the annular raceways of the two rows. In this way, outer ring 11 and inner ring 12 are rotatable relative to each other.

Figure 3:
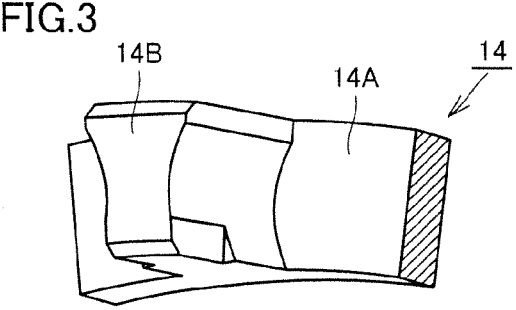
FIG. 3 is a schematic diagram showing a configuration of a cage of the double-row cylindrical roller bearing.

Here, referring to FIG. 3, each of cages 14 is a comb-shaped cage including an annular portion 14A having an annular shape and a plurality of pillar portions 14B axially projecting from annular portion 14A. Further, as shown in FIG. 2, two cages 14 are incorporated in double-row cylindrical roller bearing 1 such that respective surfaces of annular portions 14A opposite to surfaces from which pillar portions 14B project to face each other and are concentric with each other.

Further, each of cages 14 is made of a magnesium alloy such as AZ91D, and is molded by means of injection molding. Further, in cage 14, a confluence region, which is a region including voids formed by merging of flows of the magnesium alloy during the injection molding, has been eliminated by pushing the confluence region out of cage 14. Accordingly, cage 14 becomes a cage made of magnesium alloy and having a light weight and a high strength. Further, because cage 14 is thus made of magnesium alloy, sufficient specific rigidity is secured in cage 14, which is a comb-shaped cage having pillar portions 14B likely to be deflected and therefore required to have a high specific rigidity.

Further, double-row cylindrical roller bearing 1 having such cages 14 is a highly reliable rolling bearing suitable for a machine tool rolling bearing required to attain high-speed rotation.

Here, the following describes advantages of employing each of cages 14 formed through injection molding and made of magnesium alloy in the present embodiment. Because cage 14 thus made of magnesium alloy has a specific gravity smaller than a cage having the same shape and made of brass, energy loss caused by the cage under intermittent operations can be reduced to, for example, 30% or smaller. Further, cage 14 thus molded through injection molding is better in mass production than a cage made of a general metal and manufactured by machining such as cutting.

Further, because each of the cages employed in double-row cylindrical roller bearing 1 is thus made of magnesium alloy excellent in specific rigidity, the cage is less likely to be deformed even when double-row cylindrical roller bearing 1 is employed as a bearing used under high-speed rotation involving generation of large centrifugal force, such as a machine tool rolling bearing. It should be noted that the specific rigidity of the magnesium alloy (value obtained by dividing an elastic modulus by the specific gravity) is 2.5 times as large as high strength brass or greater than that, and is 1.5 times as large as a fiber-reinforced resin such as carbon fiber-reinforced PEEK resin or greater than that. Further, in general, such a fiber-reinforced resin is excellent in specific strength (value obtained by dividing the strength by the specific gravity). However, the specific strength of the magnesium alloy is equal to or greater than that of the fiber-reinforced resin and is 2.5 times as large as that of the high strength brass or greater than that.

Further, unlike fiber-added resins or the like, the magnesium alloy does not have molding anisotropy or has very small molding anisotropy. Accordingly, a sink mark or deformation resulting from such molding anisotropy is suppressed. In addition, the magnesium alloy has a smaller linear expansion coefficient than that of the resin material. Hence, a cage with high precision can be manufactured through injection molding.

Such high specific rigidity and injection precision lead to excellent rotation precision (low NRRO). Further, the magnesium alloy is excellent in absorbing vibrations, and is therefore expected to reduce operation sound of the bearing (noise reduction).

Further, the magnesium alloy has a heat conductivity higher than that of a resin, and is therefore excellent in heat dissipation. As a result, temperature can be suppressed from rising during the operation of the bearing, thereby reducing deterioration of lubricant caused by heat. This leads to longer life of the rolling bearing.

Further, if a raw material employed for the cage made of fiber-reinforced resin is a pulverized material, which is obtained by pulverizing a molded product, or a recycle material such as a re-pelleted material, which is granulated again by a fusion kneading machine, problems may take place such as physical property deterioration resulting from breakage of a reinforcement material such as a fiber or decreased matrix strength resulting from thermal deterioration. In contrast, recycling of the cage made of magnesium alloy does not result in decreased strength and also requires only approximately 5% of energy as compared with a case of producing (smelting) a new cage. In general injection molding, irrespective of employing a resin material or a magnesium alloy as the raw material, a waste matter such as a solidified portion is produced in a sprue portion or a runner portion in a mold. Here, because the magnesium alloy is excellent in terms of recycle as described above, substantially no waste matter is produced when the magnesium alloy is employed as the raw material of the cage, thereby reducing environmental burden. In addition, material cost can be reduced while securing reliability for strength. Hence, as the raw material of cage 14 in the present embodiment, it is preferable to employ magnesium alloy chips produced from a recycle material thereof.

Figure 4:
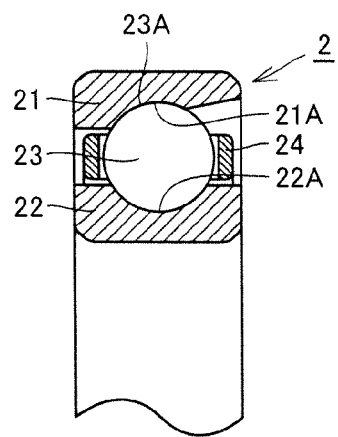
FIG. 4 is a schematic partial cross sectional view showing a configuration of an angular contact ball bearing.

The following describes each of angular contact ball bearings 2 described above. Referring to FIG. 4 and FIG. 2, angular contact ball bearing 2 and double-row cylindrical roller bearing 1 have basically the same configuration and provides basically the same effect. However, angular contact ball bearing 2 is different from double-row cylindrical roller bearing 1 in terms of shapes and the like of the bearing rings and the rolling elements.

Namely, angular contact ball bearing 2 includes outer ring 21 serving as a first raceway member; inner ring 22 serving as a second raceway member; balls 23 serving as a plurality of rolling elements; and a cage 24. Outer ring 21 has an inner circumferential surface provided with an outer ring raceway surface 21A serving as a first raceway surface of an annular shape. Inner ring 22 has an outer circumferential surface provided with an inner ring raceway surface 22A serving as a second raceway surface of an annular shape opposite to outer ring raceway surface 21A. Further, each of the plurality of balls 23 is provided with a ball contact surface 23A (surface of ball 23) serving as a rolling element contact surface. Further, balls 23 are in contact with outer ring raceway surface 21A and inner ring raceway surface 22A at ball contact surfaces 23A and are arranged circumferentially at a predetermined pitch using cage 24 each having an annular shape. Accordingly, balls 23 can be held to be rollable on the annular raceways. In this way, outer ring 21 and inner ring 22 are rotatable relative to each other.

Here, in angular contact ball bearing 2, a straight line connecting a contact point of each ball 23 and outer ring 21 to a contact point of ball 23 and inner ring 22 is angled relative to the radial direction (direction perpendicular to the rotation axis of angular contact ball bearing 2). Hence, angular contact ball bearing 2 is capable of receiving not only a load in the radial direction but also a load in the axial direction. Moreover, when the load in the radial direction is imposed, a component of force is generated in the axial direction (direction of the rotation axis of angular contact ball bearing 2). Referring to FIG. 1, in machine tool 90 of the present embodiment, two angular contact ball bearings 2 oriented in the one direction are provided at the front side (side closer to tip 91B of main shaft 91), and two angular contact ball bearings 2 oriented in a direction opposite to the direction of angular contact ball bearings 2 located at the front side are provided at the rear side (side closer to motor rotor 93B). In this way, the component of force is canceled.

Further, cage 24 is made of a magnesium alloy such as AZ91D, and is molded by means of injection molding. Further, in cage 24, a confluence region, which is a region including voids formed by merging of flows of the magnesium alloy during the injection molding, has been eliminated by pushing the confluence region out of cage 24. Accordingly, cage 24 becomes a cage made of magnesium alloy and having a light weight and a high strength.

Figure 5:
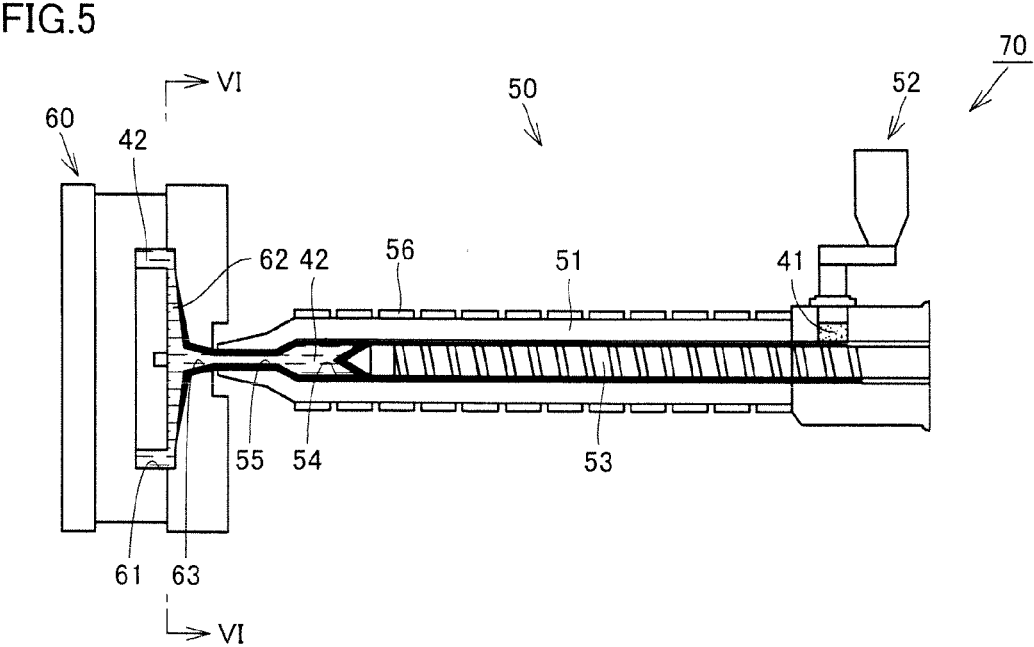
FIG. 5 is a schematic diagram showing a configuration of an injection molding device.

The following describes a method for manufacturing the cage in the present embodiment. First, an injection molding device used in the present embodiment will be described. Referring to FIG. 5, an injection molding device 70 in the present embodiment includes an injection portion 50 and a mold 60. Injection portion 50 includes: a cylinder 51 having a cylindrical hollow portion; a supplying portion 52 connected to the hollow portion of cylinder 51 and supplying magnesium alloy chips 41 to the hollow portion; a screw 53 fit into the hollow portion of cylinder 51 and having a helical groove at its outer circumferential surface; and a heater 56 disposed to surround cylinder 51. Cylinder 51 has a nozzle 55 formed at one end thereof and connected to mold 60. Further, a reservoir 54 is formed adjacent to one end of screw 53. Reservoir 54 is a region surrounded by the tip of screw 53 (end closer to mold 60) and cylinder 51. Further, reservoir 54 is connected to mold 60 via nozzle 55.

Figure 6:
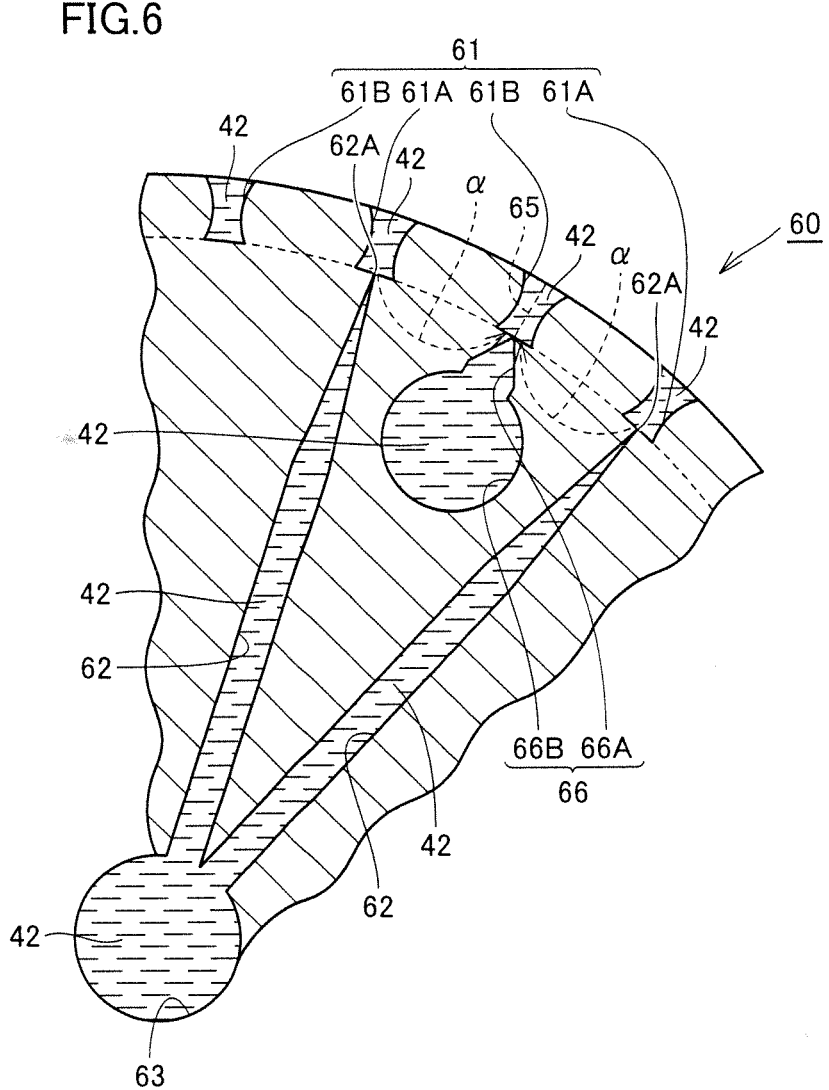
FIG. 6 is a schematic diagram showing a configuration of a mold in the first embodiment.

Referring to FIG. 5 and FIG. 6, mold 60 includes: a sprue portion 63, which is a hollow region connected to the hollow region of nozzle 55 of cylinder 51; cavity portions 61, which are hollow regions corresponding to the shape of the cage; and runner portions 62 radially extending from sprue portion 63 and connected to cavity portions 61. Each of runner portions 62 includes a gate portion 62A, and is connected to a cavity portion 61 at gate portion 62A. Cavity portions 61 include a weld region 65, which is a region at which flows of magnesium alloy supplied from runner portions 62 to cavity portions 61 are merged. Mold 60 further includes an overflow portion 66 connected to weld region 65 and storing magnesium alloy having reached weld region 65 and flooded from cavity portion 61. Overflow portion 66 has a discharging portion 66A connected to weld region 65, and a retaining portion 66B connected to discharging portion 66A.

Figure 7:
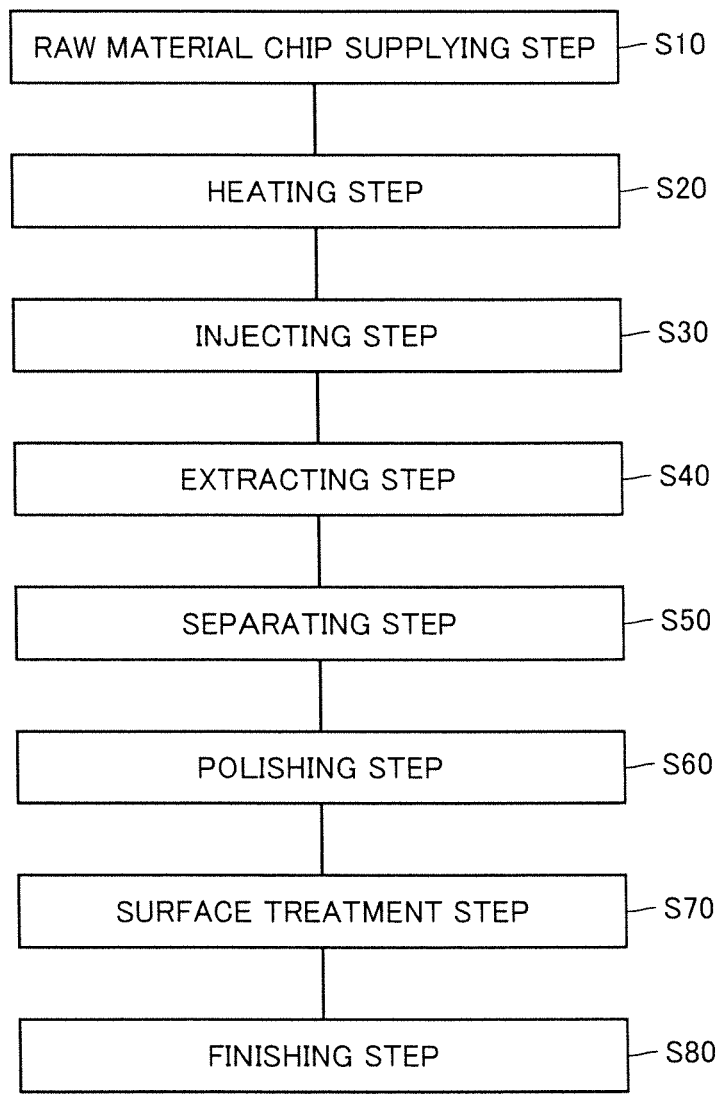
FIG. 7 is a flowchart schematically showing steps in manufacturing the cage.

Referring to FIG. 5-FIG. 7, the following describes a method for manufacturing the cage using injection molding device 70 described above. Referring to FIG. 7, in the method for manufacturing the cage in the present embodiment, a raw material chip supplying step is first performed as a step (S10). In this step (S10), referring to FIG. 5, magnesium alloy chips 41 produced from a recycle material are supplied from supplying portion 52 of injection portion 50 into cylinder 51.

Next, as a step (S20), a heating step is performed. In this step (S20), screw 53 is rotated axially to move magnesium alloy chips 41, which has been supplied into cylinder 51 in step (S10), along the helical groove formed at the outer circumferential surface of screw 53, while heating magnesium alloy chips 41 to reach or exceed the melting point thereof using heater 56. Accordingly, magnesium alloy chips 41 are brought into a molten state, i.e., become molten magnesium alloy 42, which is then stored in reservoir 54. On this occasion, molten magnesium alloy 42 may be in a complete molten state, i.e., have only a liquid phase with no solid phase, or may be in a semi-molten state in which magnesium ($\alpha$ phase) in the solid phase is dispersed in the liquid phase. However, in the case of the semi-molten state, the ratio of solid phase is preferably small. Specifically, the ratio of the $\alpha$ phase is preferably less than 5% in area ratio when observing a cross section of the magnesium alloy after solidification thereof. This suppresses fatigue strength, etc., of the completed cage from decreasing due to the $\alpha$ phase serving as a source of stress concentration.

Next, an injecting step is performed as a step (S30). In this step (S30), screw 53 is moved to come closer to mold 60, thereby injecting molten magnesium alloy 42, which has been stored in reservoir 54 in step (S20), into mold 60. Referring to FIG. 6, molten magnesium alloy 42 thus injected into mold 60 is first supplied to sprue portion 63, and then is branched into the plurality of runner portions 62 to flow into cavity portions 61. On this occasion, in the case where the cage is to be shaped to have an even number of pockets for holding rolling elements as shown in FIG. 6, molten magnesium alloy 42 is injected from adjacent runner portions 62 into cavity portions 61A disposed to sandwich two pockets therebetween, i.e., disposed to come alternately in cavity portions 61, for example. Here, cavity portions 61 adjacent to each other (cavity portion 61A and cavity portion 61B) in FIG. 6 are coupled to each other at front and rear sides in the axial direction (the forward and backward sides in the plane of sheet). Hence, the flows of molten magnesium alloy 42 supplied into the two cavity portions 61A from runner portions 62 are merged as indicated by broken line arrows $\alpha$ at weld region 65 of cavity portion 61B sandwiched between the two cavity portions 61A. When molten magnesium alloy 42 is further provided to the two cavity portions 61A, molten magnesium alloy 42 is flooded from the cavity portions to flow into overflow portion 66 and is then stored therein.

Next, as a step (S40), an extracting step is performed. In this step (S40), the cage, which has been fabricated by the injection and solidification in mold 60 in step (S30), is extracted from mold 60.

Further, as a step (S50), a separating step is performed. The cage thus extracted in step (S40) has magnesium alloy solidified in runner portions 62 or overflow portion 66. In this step (S50), such a magnesium alloy constituting a region other than the cage itself is separated from the cage.

Here, in the present embodiment, referring to FIG. 6, each runner portion 62 has a gate portion boundary surface, which is a surface of a boundary with cavity portion 61. The gate portion boundary surface has a cross sectional area smaller than the area of a cross section parallel to the gate portion boundary surface in a region adjacent to the gate portion boundary surface. More specifically, runner portion 62 has a smaller cross sectional area in a cross section perpendicular to the longitudinal direction thereof, as it come closer to cavity portion 61. At the gate portion boundary surface, runner portion 62 has the smallest cross sectional area. Further, overflow portion 66 has a discharging portion boundary surface, which is a surface of boundary with cavity portion 61. The discharging portion boundary surface has a cross sectional area smaller than the area of a cross section parallel to the discharging portion boundary surface in a region adjacent to the discharging portion boundary surface. Namely, as with runner portion 62, overflow portion 66 has a smaller cross sectional area in a cross section perpendicular to the longitudinal direction thereof, as it come closer to cavity portion 61. At the discharging portion boundary surface, overflow portion 66 has the smallest cross sectional area. Accordingly, the magnesium alloy (cage) solidified in cavity portion 61 and the magnesium alloy solidified in each of runner portions 62 can be readily separated from each other at the gate portion boundary surface. Likewise, the magnesium alloy (cage) solidified in cavity portion 61 and the magnesium alloy solidified in overflow portion 66 can be readily separated from each other at the discharging portion boundary surface. As a result, in the present embodiment, step (S40) and step (S50) can be performed simultaneously. In other words, when extracting the cage from mold 60, the magnesium alloy in the regions other than the cage can be separated from the cage.

Next, as a step (S60), a polishing step is performed. In this step (S60), the cage thus separated in step (S50) is subjected to polishing such as barrel polishing. Accordingly, the surface of the cage becomes smooth.

Next, as a step (S70), a surface treatment step is performed. In this step (S70), the surface of the cage is treated, for example, anodized. Step (S70) is not an essential step in the method for manufacturing the cage of the present invention, but improves corrosion resistance and wear resistance of the cage when performed.

Then, as a step (S80), a finishing step is performed. In this step (S80), a polishing treatment, such as barrel polishing, performed when the surface treatment in step (S70) results in large irregularities at the surface thereof, a sealing treatment, an overcoat treatment, or the like is performed as required. With the steps described above, cage 14 or cage 24 in the present embodiment is completed.

In the method for manufacturing the cage in the present embodiment, the flows of molten magnesium alloy 42 are merged in step (S30) as described above, thereby forming the confluence region, which includes voids, in weld region 65 of cavity portion 61B. However, this confluence region is pushed out of the cage (cavity portion 61) because molten magnesium alloy 42 is flooded from cavity portion 61B to flow into overflow portion 66. As a result, the confluence region is eliminated from the cage. Accordingly, the confluence region including the voids is prevented from remaining in the cage to result in decreased strength. Thus, according to the method for manufacturing the cage using injection molding device 70 in the present embodiment, there can be manufactured a cage made of magnesium alloy and having a light weight and a high strength. It should be noted that whether or not the confluence region has been pushed out of cavity portion 61 can be confirmed by examining the surface and cross section of the weld portion of the completed cage. Specifically, the weld portion formed between adjacent gates or around the rolling element holding portion of the cage has a characteristic external appearance, generally called "weld line". In the cage manufactured using the manufacturing method in the present invention, no weld line exists or a trace of fluidity extending from the inside of the cage toward outside or a trace of removal of the overflow portion is observed. Depending on conditions of molding, whether or not the confluence region has been pushed out of cavity portion 61 can be confirmed in some cases by texture observation because the abundance of a phase in the vicinity of the discharging portion is likely to be smaller than that in the vicinity of the gate portion due to a difference of cooling rates in the mold.

Second Embodiment

The following describes another embodiment of the present invention, i.e., a second embodiment. Cages and rolling bearings in the second embodiment have configurations similar to those in the first embodiment, provide similar effects, and can be manufactured in similar manners. They are different in that while each of the cages in the first embodiment has the even number of pockets for holding the rolling elements, each of the cages in the second embodiment has an odd number of pockets. Accordingly, the first embodiment and the second embodiment differ from each other in the configurations of the molds used in injection molding.

Figure 8:
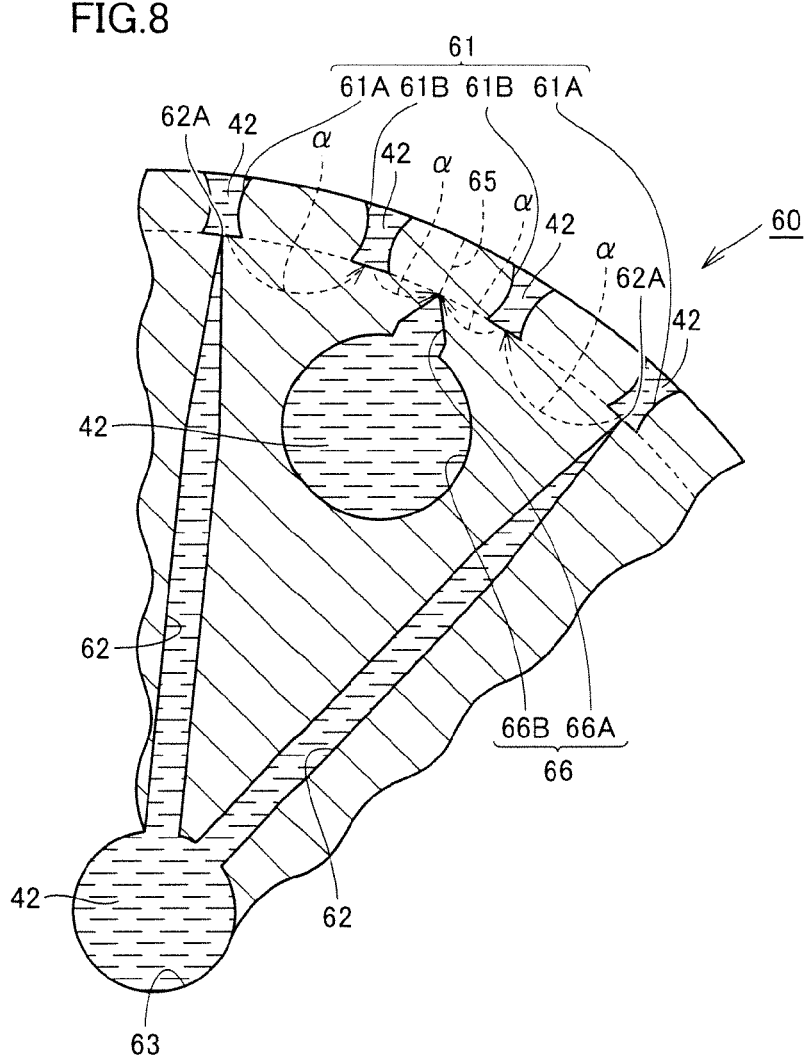
FIG. 8 is a schematic diagram showing a configuration of a mold in a second embodiment.

Referring to FIG. 8, in the case where the cage is to be shaped to have the odd number of pockets for holding the rolling elements in the second embodiment, molten magnesium alloy 42 is injected from adjacent runner portions 62 into cavity portions 61A disposed to sandwich three pockets therebetween, i.e., disposed to come every three cavity portions 61. Here, cavity portions 61 adjacent to each other in FIG. 8 are coupled to each other at front and rear sides in the axial direction (the forward and backward sides in the plane of sheet). Hence, the flows of molten magnesium alloy 42 supplied into two cavity portions 61A from runner portions 62 come into two cavity portions 61B sandwiched between the two cavity portions 61A and are merged at weld region 65 formed in the center between the tow cavity portions 61B (front or rear side in the plane of sheet), as indicated by broken line arrows α. When molten magnesium alloy 42 is further provided to the two cavity portions 61A, molten magnesium alloy 42 is flooded from the cavity portions to flow into overflow portion 66 and is then stored therein.

Also in the present embodiment, as with the first embodiment, the flows of molten magnesium alloy 42 are merged in step (S30) to form a confluence region including voids in weld region 65. In the second embodiment, this weld region 65 is located at the central portion of the pockets, which is a region thin in thickness (central portion in the circumferential direction of the cage). Accordingly, if the confluence region having the voids remains in the region, the strength of the cage is likely to be less sufficient than that in the first embodiment. However, this confluence region is pushed out of cavity portion 61 because molten magnesium alloy 42 is flooded from cavity portion 61 to flow into overflow portion 66. As a result, the confluence region is eliminated from the cage. Accordingly, the confluence region including the voids is prevented from remaining in the cage to result in decreased strength. As such, even in the case where the confluence region is formed in the region thin in thickness in the cage, the present invention can be particularly effectively applied.

It should be noted that in the embodiments described above, the ASTM standard AZ91D is illustrated as the magnesium alloy applicable to the present invention, but the magnesium alloy applicable to the present invention is not limited to this and various types of magnesium alloys for die casting can be used. An example of the magnesium alloy usable in the present invention is an alloy obtained by adding aluminum (Al), zinc (Zn), manganese (Mn), silicon (Si), or the like to magnesium (Mg), which is the main component. For improved incombustibility or improved heat resistance and toughness, calcium (Ca) or gadolinium (Gd), copper (Cu), iron (Fe), nickel (Ni), a rare earth element, or the like may be added thereto as required. Specifically, a Mg—Al—Zn—Mn-based alloy such as AZ91D of the ASTM standard, a Mg—Al—Mn-based alloy such as AM60B, a Mg—Al—Si—Mn-based alloy such as AS41A, or the like can be employed.

Further, the volume of overflow portion 66 is not particularly limited, but is preferably not less than 5% of the volume of cavity portion 61 in order to securely eliminate the confluence portion from the cage (product), more preferably, is not less than 10% thereof in order to eliminate the confluence portion more securely. On the other hand, in view of material yield, fewer wasted material is more preferable. Hence, it is preferable that the volume of overflow portion 66 is not more than 30% of cavity portion 61.

Further, various methods can be employed to separate (remove), from the cage, the magnesium alloy solidified in each of runner portion 62 and overflow portion 66 in step (S50). A specific exemplary method is machining employing a pressing machine, such as a trimming process, a barrel process, or a cutting process.

There are also methods suitably used therefor, such as a hot nozzle or hot runner method allowing for reduction of an amount of magnesium alloy solidified in sprue portion 63 and runner portion 62, and a molding method employing in-mold gate cut method in which a gate is cut in the mold. It should be noted that the in-mold process is capable of removing not only the magnesium alloy solidified in sprue portion 63 and runner portion 62 but also the magnesium alloy solidified in overflow portion 66.

Further, the surface treatment can be performed before or after removing the magnesium alloy solidified in each of sprue portion 63, runner portion 62, and overflow portion 66, but it is preferable to perform the surface treatment after the removal thereof. Exemplary specific surface treatments are as follows: plating treatment employing a metal excellent in corrosion resistance; resin coating; conversion treatment or anodizing for altering the surface into magnesium hydroxide or magnesium oxide. Among these, it is particularly preferable to employ the anodizing because it is less likely to result in insufficient adhesion at the interface and allows for excellent corrosion resistance and wear resistance. It should be noted that the anodizing is likely to result in a large surface roughness. Hence, the following treatment may be performed as required after the surface treatment: polishing treatment such as barrel polishing; sealing by a resin material or sealing by steam treatment, boiling water treatment, or chemical treatment using a nickel acetate solution; or overcoat treatment. If the polishing treatment is performed, an amount of polishing can be smaller than the thickness of the alteration layer in order to leave the alteration layer formed through the surface treatment. When the alteration layer has a thickness of approximately 3 μm or greater, a big problem does not take place in terms of functionality, but the thickness thereof is preferably 5 μm or greater in terms of durability because the cage has a sliding portion in contact with a rolling element or a bearing ring. It should be noted that as the alteration layer is thicker in thickness, the wear resistance and corrosion resistance become more excellent. However, growth of recesses (increased surface roughness) and change in the shape such as volumetric expansion, both of which are involved in the alteration, become also greater. Accordingly, the thickness is preferably 20 μm or smaller, and is particularly preferably 10 μm or smaller.

Further, the cage of the present invention may be of various shapes such as a crown-shaped cage, a machined cage, a comb-shaped cage, and a window type cage and is not particularly limited in terms of its shape. Among these, the cage of the present invention can be suitably used for the comb-shaped cage or the crown-shaped cage, both of which are required to have a high rigidity. Further, the cage of the present invention is applicable to rolling bearings of various types such as a radial ball bearing, a radial roller bearing, a ball thrust bearing, a thrust roller bearing, and an angular contact ball bearing, and can be suitably employed without a particular limitation in a type of rolling bearing. Further, a type of guide in the cage is not particularly limited and the present invention can be applied to any type of guide such as a rolling element guide, an outer ring guide, and an inner ring guide.

Example

The following describes examples of the present invention. The cages of the present invention were actually fabricated and an experiment was conducted to compare characteristics thereof with those of conventional cages. The experiment was conducted in the following procedure.

First, a cage illustrated in an embodiment described above was fabricated using the same method as that in the embodiment. The cage was shaped to be a comb-shaped cage, which is usable for the bearing number NN3020 (ES bearing designation), as shown in FIG. 1 and FIG. 2. More specifically, the cage was formed to have an inner diameter φ of 120 mm, an outer diameter φ of 132 mm, a height of 10.5 mm, an annular portion 14A (see FIG. 2) having a thickness of 2.3 mm, a PCD (Pitch Circle Diameter) φ of 126 mm, and eleven pillars. Further, the cage was manufactured by performing steps (S10)-(S60) of the manufacturing method described in the above-described embodiment (see FIG. 7). In step (S10), magnesium alloy chips made of AZ91D were employed as raw material chips. Steps (S20) and (S30) were performed under the following conditions: a nozzle temperature of 610° C., a mold temperature of 250° C., an injection rate of 1200 mm/s, pressure kept at 15 MPa, and a cool time of 10 s. Further, in step (S50), the magnesium alloy solidified in overflow portion 66 was removed by press molding. Further, in step (S60), barrel polishing was performed (example A).

In addition, another cage was manufactured to have the same shape as that of example A, using the same manufacturing steps as well as step (S70). In step (S70), the anodizing was performed to form an alteration layer having a thickness of 10 μm (example B).

Further, for comparison with the examples of the present invention, there were prepared a cage (comparative example A) having the same shape as those of the examples and made of a high strength brass and a cage (comparative example B) having the same shape and made of a resin. In comparative example A, high strength brass CAC301 was employed as a raw material, and was cut into the above-described shape, thereby fabricating the cage. In comparative example B, the cage was fabricated by injection-molding, into a PEEK (Poly Ether EtherKeton) material, a resin (PEEK450CA30 provided by Victrex) having a CF (carbon fiber) material added thereto. Specifically, the injection molding was performed under the following conditions: a nozzle temperature of 400° C., a mold temperature of 180° C., an injection rate of 50 mm/s, a pressure kept at 120 MPa, and a cool time of 30 s. Further, as post treatment, annealing treatment was performed by heating it to 200° C. and retaining it for 3 hours.

The following describes items and results in the experiment. First, an experiment was conducted to actually construct NN3020 bearings using the cages of example A and example B described above. Specifically, each of the bearings was assembled by preparing an inner ring and an outer ring each made of a SUJ2 material of the JIS standard and rolling elements made of silicon nitride, and incorporating two cages of each example with their rear surfaces face each other (see FIG. 1). As a result, the cages of each of example A and example B can be incorporated thereinto without any problem. Further, no defects take place in the alteration layer formed in the cage of example B by the anodizing, such as peeling thereof.

Figure 9:
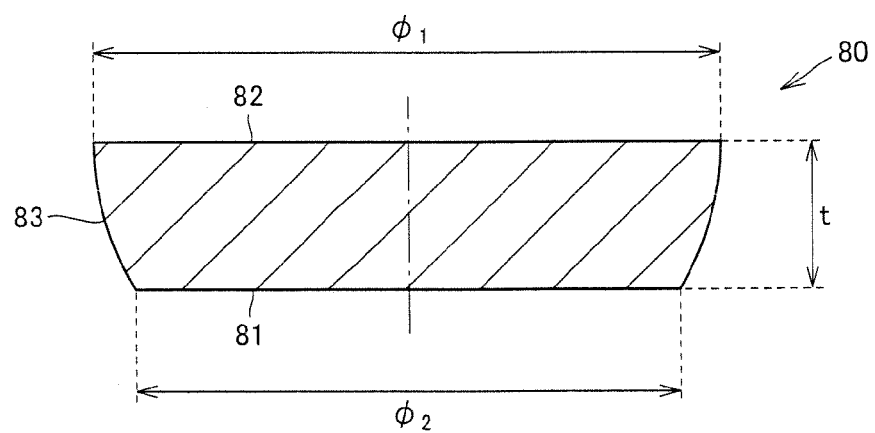
FIG. 9 is a schematic cross sectional view showing a configuration of a jig for use in an experiment.

Next, each of the cages of the examples and the comparative examples was measured for a cage mass, a cage strength, and an pillar deflection amount. The cage strength was measured by recording a load when the cage is broken by pulling the cage with opposing forces applied from the inner diameter side of the cage in the diameter direction of the cage. The pillar deflection amount was measured by measuring an amount of collapse of the pillar (amount of change in outer diameter) when applying a constant load to push a jig shown in FIG. 9 to insert its smaller diameter side (diameter ϕ2 side) into the inner diameter side of the cage placed on a flat surface with the annular portion of the cage facing downward. Here, referring to FIG. 9, jig 80 includes: a first flat surface 82 having a circular shape with a diameter ϕ1 (132 mm); a second flat surface 81 parallel to first flat surface 82 and having a circular shape with a diameter ϕ2 (115.5 mm); and a side surface 83 that is a spherical surface having a curvature radius of 66 mm. A thickness t, i.e., a distance between first flat surface 82 and second flat surface 81 is 32 mm.

TABLE 1

|  | Example A | Example B | Comparative Example A | Comparative Example B |
|---|---|---|---|---|
| Material | AZ91D | AZ91D | PEEK/CF | CAC301 |
| Method | Injection Molding | Injection Molding | Injection Molding | Machining |
| Surface Treatment | N/A | Anodizing (Film Thickness: 10 μm) | N/A | N/A |
| Mass Ratio | 0.2 | 0.2 | 0.2 | 1.0 |
| Strength Ratio | 1.1 | 1.1 | 1.0 | 1.9 |
| Pillar Deflection Amount Ratio | 0.4 | 0.4 | 1.0 | 0.3 |

Table 1 shows results of the experiment. Table 1 shows cage masses in mass ratio, assuming that a cage mass of comparative example B is 1. Also, Table 1 shows cage strengths and pillar deflection amounts in strength ratio and pillar deflection amount ratio, assuming that those in comparative example A are 1 respectively.

Referring to Table 1, the mass of each of examples A and B is ⅕ of the cage made of high strength brass in comparative example B. Also, it is confirmed that the cage of the present invention achieved reduced weight as light as that of the cage made of resin in comparative example A. Further, the strength of each of examples A and B exceeds that of the cage made of resin in comparative example A. Further, the pillar deflection amount of each of examples A and B is significantly reduced as compared with the cage made of resin in comparative example A. The value thereof is comparable to the cage made of high strength brass in comparative example B.

From the results of the experiment, it was confirmed that the cage of the present invention can be manufactured by injection molding, which is good for mass production, and is light-weighted and has a high strength and rigidity.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

A cage, a rolling bearing, a method for manufacturing the cage, and an injection mold in the present invention are particularly advantageously applicable to a cage required to have a light weight and a high strength, a rolling bearing, a method for manufacturing the cage, and an injection mold usable for the manufacturing method.

REFERENCE SIGNS LIST

1: double-row cylindrical roller bearing; 2: angular contact ball bearing; 11, 21: outer ring; 11A, 21A: outer ring raceway surface; 12, 22: inner ring; 12A, 22A: inner ring raceway surface; 13: cylindrical roller; 13A: roller contact surface; 14, 24: cage; 14A: annular portion; 14B: pillar portion; 23: ball; 23A: ball contact surface; 41: magnesium alloy chip; 42: molten magnesium alloy; 50: injection portion; 51: cylinder; 52: supplying portion; 53: screw; 54: reservoir; 55: nozzle; 56: heater; 60: mold; 61, 61A, 61B: cavity portion; 62: runner portion; 62A: gate portion; 63: sprue portion; 65: weld region; 66: overflow portion; 66A: discharging portion; 66B: retaining portion; 70: injection molding device; 80: jig; 81: second flat surface; 82: first flat surface; 83: side surface; 90: machine tool; 91: main shaft; 91A: outer circumferential surface; 91B: tip; 92: housing; 92A: inner wall; 93: motor; 93A: motor stator; 93B: motor rotor.

The invention claimed is:

1. A cage for holding a rolling element in a rolling bearing, the cage being made of a magnesium alloy, the cage being molded by injection molding, and wherein a confluence region is brought away to outside the cage during said injection molding, said confluence region being a region including a void formed by merging of flows of said magnesium alloy being in a complete molten state, such that no weld line exists at a weld portion of the cage.

2. The cage according to claim 1, wherein said magnesium alloy contains aluminum, zinc, and manganese.

3. The cage according to claim 1, wherein the cage is comb-shaped.

4. A rolling bearing comprising:
a raceway member;
a plurality of rolling elements arranged in contact with said raceway member; and
a cage for rollably holding said rolling elements,
said cage being the cage recited in claim 1.

5. The rolling bearing according to claim 4, wherein the rolling bearing is used to rotatably support a main shaft of a machine tool relative to a member disposed opposite to said main shaft.

6. A method for manufacturing a cage for holding a rolling element in a rolling bearing, comprising the steps of:
causing a magnesium alloy to be in a complete molten state by heating said magnesium alloy;
molding said magnesium alloy, into a shape of said cage by injecting said magnesium alloy into a mold including a cavity portion corresponding to the shape of said cage so as to fill said cavity portion with said magnesium alloy; and extracting, from said mold, said cage formed of said magnesium alloy thus molded into the shape of said cage, wherein in the step of molding said magnesium alloy into the shape of said cage, a confluence region is brought away to outside said cavity portion, said confluence region being a region including a void formed by merging of flows of said magnesium alloy, such that no weld line exists at a weld portion of said cage.

7. The method for manufacturing the cage according to claim 6, wherein said magnesium alloy contains aluminum, zinc, and manganese.

8. The method for manufacturing the cage according to claim 6, wherein said cage is comb-shaped.

\* \* \* \* \*